(12) United States Patent
Al-Jarallah et al.

(10) Patent No.: US 12,208,429 B2
(45) Date of Patent: *Jan. 28, 2025

(54) SIMULTANEOUSLY UNBLOCKING MULTIPLE VALVE FITTINGS

(71) Applicant: Saudi Arabian Oil Company, Dhahran (SA)

(72) Inventors: Bader M. Al-Jarallah, Dammam (SA); Abdullah B. Samman, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,849

(22) Filed: Nov. 6, 2023

(65) Prior Publication Data
US 2024/0066568 A1 Feb. 29, 2024

Related U.S. Application Data (62) Division of application No. 17/140,222, filed on Jan. 4, 2021, now Pat. No. 11,839,908.

(51) Int. Cl.
*B08B 9/032* (2006.01)
*F16K 3/00* (2006.01)

(52) U.S. Cl.
CPC .......... *B08B 9/0325* (2013.01); *B08B 9/0321* (2013.01); *B08B 9/0328* (2013.01);
(Continued)

(58) Field of Classification Search
CPC ............ B08B 9/00–46; B08B 3/00–14; F16K 27/00–12; F16K 5/00–227;
(Continued)

(56) References Cited

U.S. PATENT DOCUMENTS

| | | | |
|---|---|---|---|
| 29,299 | A | 7/1860 | Norville |
| 3,273,855 | A | 9/1966 | Wells |

(Continued)

FOREIGN PATENT DOCUMENTS

| | | |
|---|---|---|
| CN | 202371199 | 8/2012 |
| CN | 108543778 | 9/2018 |

(Continued)

OTHER PUBLICATIONS lacier.in [online], "API 6D valves," Lacier Industries (I), The Valve Company with an Edge, retrieved from URL <https://www.lacier.in/gate/>, retrieved on Jul. 17, 2019, available on or before 2018, 4 pages.

(Continued)

*Primary Examiner* — Mikhail Kornakov
*Assistant Examiner* — Richard Z. Zhang
(74) *Attorney, Agent, or Firm* — Fish & Richardson P.C.

(57) ABSTRACT

A method for simultaneously unblocking multiple blocked valve fittings is described. The method includes coupling a tool to unblock multiple valve fittings simultaneously to a valve with multiple valve fitting blocked to fluid flow. The tool includes a pressure vessel holding a cleaning fluid, an input conduit fluidically coupled to the pressure vessel to flow the cleaning fluid from a cleaning fluid source to the pressure vessel and to adjust a pressure of the pressure vessel, and injection conduits to flow the cleaning fluid from the pressure vessel to the valve fittings. The method includes simultaneously flowing the cleaning fluid from the pressure vessel through the injection conduits to the valve fittings. Responsive to flowing the cleaning fluid to the valve fitting, the valve fittings are unblocked.

20 Claims, 3 Drawing Sheets

(52) U.S. Cl.
CPC .......... *B08B 2209/032* (2013.01); *F16K 3/00* (2013.01); *Y10T 137/0514* (2015.04)

(58) Field of Classification Search
CPC ... Y10T 137/00–9682; Y10T 137/0514; G01L 7/00–24; B60S 3/04–066; B05B 9/00–0894
See application file for complete search history.

(56) References Cited

U.S. PATENT DOCUMENTS

| | | | |
|---|---|---|---|
| 3,605,789 | A | 9/1971 | Graham |
| 4,083,376 | A | 4/1978 | Alaniz |
| 4,741,509 | A | 5/1988 | Bunch et al. |
| 5,416,947 | A | 5/1995 | Jaffe |
| 6,308,899 | B1 * | 10/2001 | Crofford ................ B08B 3/026 239/525 |
| 6,564,814 | B2 | 5/2003 | Bowsman et al. |
| 6,698,444 | B1 | 3/2004 | Enston |
| 9,016,293 | B2 | 4/2015 | Battaglioli et al. |
| 9,903,483 | B2 | 2/2018 | Liu |
| 2007/0105464 | A1 | 5/2007 | Vasilaros |
| 2011/0108138 | A1 | 5/2011 | Sugita et al. |
| 2014/0183396 | A1 | 7/2014 | Hunter et al. |
| 2018/0038491 | A1 | 2/2018 | Gaburri et al. |

FOREIGN PATENT DOCUMENTS

| | | | |
|---|---|---|---|
| CN | 110014000 | | 7/2019 |
| CN | 111069137 | | 4/2020 |
| CN | 111069137 A | * | 4/2020 |
| EP | 2108752 | | 10/2009 |
| EP | 2636461 | | 9/2013 |
| GB | 2346945 | | 8/2000 |
| JP | S52136425 | | 11/1977 |
| KR | 20170038212 | | 4/2017 |
| KR | 20170038212 A | * | 4/2017 |
| KR | 20170114183 | | 10/2017 |
| KR | 101866368 | | 6/2018 |
| WO | WO 2017158077 | | 9/2017 |
| WO | WO 2018236223 | | 12/2018 |

OTHER PUBLICATIONS

PCT International Search Report and Written Opinion in International Appln. No. PCT/US2022/011148, dated May 13, 2022, 15 pages.

products.slb.com, [online], "Grove API 6D Fabricated Gate Valve (Small Bore)," Schlumberger, retrieved from URL <https://www.products.slb.com/valves/brands/grove/grove-g4n-gate-valve>, retrieved on Jul. 17, 2019, available on or before 2018, 3 pages.

* cited by examiner

SIMULTANEOUSLY UNBLOCKING MULTIPLE VALVE FITTINGS

CROSS-REFERENCE TO RELATED PATENT APPLICATIONS

This application is a divisional of U.S. patent application Ser. No. 17/140,222, filed Jan. 4, 2021, the contents of which are incorporated by reference herein.

TECHNICAL FIELD

This disclosure relates to valves to control fluid flow.

BACKGROUND OF THE DISCLOSURE

Some valves have components and clearances between components that can become blocked with corrosion or debris over time. Valves can contain valve fittings positioned on an external surface of the valve and located proximal to regions of potential blockages for unblocking these regions of potential blockages. Multiple blockages can occur at the same time in a valve. One or more blockages can cause a valve to fail.

SUMMARY

This disclosure describes technologies related to methods for simultaneously unblocking multiple blocked valve fittings. Implementations of the present disclosure include a method for simultaneously unblocking the multiple blocked valve fittings. The method includes coupling a tool which unblocks multiple valve fittings simultaneously to a valve. The valve includes a first valve fitting and a second valve fitting. The first valve fitting and the second valve fitting are blocked to fluid flow through the valve. The tool includes a pressure vessel to hold a cleaning fluid. The tool also includes an input conduit fluidically coupled to the pressure vessel. The input conduit flows the cleaning fluid from a cleaning fluid source to the pressure vessel. The input conduit flows a fluid to adjust a pressure of the pressure vessel. The tool includes a first injection conduit having a first injection conduit first end mechanically coupled to the pressure vessel and a first injection conduit second end to mechanically couple to the first valve fitting. The first injection conduit flows the cleaning fluid from the pressure vessel to the first valve fitting. The tool includes a second injection conduit having a second injection conduit first end mechanically coupled to the pressure vessel. The tool includes a second injection conduit second end to mechanically couple to the second valve fitting. The second injection conduit flows the cleaning fluid from the pressure vessel to the second valve fitting. Flowing the cleaning fluid from the cleaning fluid source can include flowing the cleaning fluid through the input conduit into the pressure vessel. The tool is portable. The method for simultaneously unblocking the multiple blocked valve fittings includes simultaneously flowing the cleaning fluid from the pressure vessel through the first injection conduit to the first valve fitting and through the second injection conduit to the second valve fitting. Flowing the cleaning fluid from the pressure vessel through the first injection conduit to the first valve fitting and through the second injection conduit to the second valve fitting can include pressurizing the pressure vessel.

Simultaneously flowing the cleaning fluid from the pressure vessel through the first injection conduit to the first valve fitting and through the second injection conduit to the second valve fitting can include opening a first injection valve positioned in the first injection conduit. The first injection valve controls cleaning fluid flow through the first injection conduit. Responsive to opening the first injection valve, the cleaning fluid flows from the pressure vessel to the first valve fitting. Simultaneously flowing the cleaning fluid from the pressure vessel through the first injection conduit to the first valve fitting and through the second injection conduit to the second valve fitting can include shutting the first injection valve. Responsive to shutting the first injection valve, the flow of the cleaning fluid stops from the pressure vessel to the first valve fitting. Simultaneously with opening the first injection valve, the method can include opening a second injection valve positioned in the second injection conduit to control cleaning fluid flow through the second injection conduit. Responsive to opening the second injection valve, the cleaning fluid flows from the pressure vessel to the second valve fitting. The method includes shutting the second injection valve. Responsive to shutting the second injection valve, flow of the cleaning fluid stops from the pressure vessel to the second valve fitting.

Simultaneously flowing the cleaning fluid from the pressure vessel through the first injection conduit to the first valve fitting and through the second injection conduit to the second valve fitting can include a first pressure gauge fluidically coupled to the first injection conduit downstream from the first injection valve. Downstream from the first injection valve is away from the pressure vessel. The first pressure gauge monitors a first fluid pressure in the first valve fitting. A second pressure gauge is fluidically coupled to the second injection conduit downstream from the second injection valve. The second pressure gauge monitors a second fluid pressure in the second valve fitting. Simultaneously flowing the cleaning fluid from the pressure vessel through the first injection conduit to the first valve fitting and through the second injection conduit to the second valve fitting can include, before opening the first injection valve, sensing a first injection conduit pressure with the first pressure gauge. The method includes determining that the first injection conduit pressure is less than the minimum injection pressure. In response to determining that the first injection conduit pressure is less than the minimum injection pressure; the method includes opening the first injection valve positioned in the first injection conduit. The method includes sensing the first injection conduit pressure is at least the minimum injection pressure. Responsive to sensing the first injection conduit pressure is at least the minimum injection pressure, the method includes shutting the first injection valve. Simultaneously before opening the second injection valve, the method includes sensing a second injection conduit pressure with the second pressure gauge. The method includes determining that the second injection conduit pressure is less than the minimum injection pressure. In response to determining that the second injection conduit pressure is less than the minimum injection pressure; the method includes opening the second injection valve positioned in the second injection conduit. The method includes sensing the second injection conduit pressure is at least the minimum injection pressure. Responsive to sensing the second injection conduit pressure is at least the minimum injection pressure, the method includes shutting the second injection valve.

Pressurizing the pressure vessel, where the tool includes a manual hand pump, includes coupling a manual hand pump to the input conduit. Pressurizing the pressure vessel with the manual hand pump includes opening an input pressure isolation valve positioned in input conduit. Pressurizing the pressure vessel with the manual hand pump includes operating a manual hand pump coupled to the input conduit to raise the pressure to a minimum injection pressure. The minimum injection pressure is a minimum pressure necessary to unblock multiple valve fittings simultaneously. Pressurizing the pressure vessel with the manual hand pump includes determining a pressure vessel pressure has reached at least the minimum injection pressure. In response to determining that the pressure vessel pressure has reached at least the minimum injection pressure, pressurizing the pressure vessel with the manual hand pump includes shutting the input pressure isolation valve to maintain the pressure vessel pressure at the minimum injection pressure.

The method for unblocking the blocked valve fitting includes, responsive to flowing the cleaning fluid to the valve fitting, unblocking the first valve fitting.

The method for unblocking the blocked valve fitting includes, responsive to flowing the cleaning fluid to the valve fitting, unblocking the second valve fitting.

Where the tool includes a pressure vessel pressure gauge fluidically coupled to the pressure vessel, the method can include sensing, by the pressure vessel pressure gauge, pressure vessel pressure.

The method can include decoupling the tool from the valve. Decoupling the tool from the valve can include decoupling the first injection conduit second end from the first valve fitting and decoupling the second injection conduit second end from the second valve fitting.

The method can include determining when the first valve fitting and the second valve fitting are blocked to fluid flow through the valve. Determining when the first valve fitting and the second valve fitting are blocked to fluid flow through the valve includes opening the first injection valve. The method includes flowing the cleaning fluid through the first injection conduit. The method includes sensing the first injection conduit pressure is at least the minimum injection pressure. The method includes shutting the first injection valve. The method includes sensing a first injection conduit pressure rate decrease over a time period. The method includes comparing the first injection conduit pressure rate decrease to a first injection conduit pressure rate threshold decrease. The method includes determining that the first injection conduit is blocked when the first injection conduit pressure rate decrease is less than the first injection conduit pressure rate threshold decrease. The method includes opening the second injection valve. The method includes flowing the cleaning fluid through the second injection conduit. The method includes sensing the second injection conduit pressure is at least the minimum injection pressure. The method includes shutting the second injection valve. The method includes sensing a second injection conduit pressure rate decrease over the time period. The method includes comparing the second injection conduit pressure rate decrease to a second injection conduit pressure rate threshold decrease. The method includes determining that the second injection conduit is blocked when the second injection conduit pressure rate decrease is equal to or less than the second injection conduit pressure rate threshold decrease.

Further implementations of the present disclosure include a method including coupling a first injection conduit to flow a cleaning fluid to a first valve fitting. The first valve fitting is blocked to fluid flow through the valve. The method includes coupling a second injection conduit configured to flow the cleaning fluid to a second valve fitting. The second valve fitting is blocked to fluid flow through the valve. The method includes coupling the first injection conduit to a pressure vessel configured to hold the cleaning fluid. The method includes coupling the second injection conduit to the pressure vessel. The method includes pressurizing the pressure vessel holding the cleaning fluid.

The method includes, responsive to pressurizing the pressure vessel, simultaneously flowing the cleaning fluid from the pressure vessel through the first injection conduit to the first valve fitting and through the second injection conduit to the second valve fitting. Simultaneously flowing the cleaning fluid from the pressure vessel through the first injection conduit to the first valve fitting and through the second injection conduit to the second valve fitting can include a first pressure gauge fluidically coupled to the first injection conduit downstream from the first injection valve. Downstream from the first injection valve is away from the pressure vessel. The first pressure gauge monitors a first fluid pressure in the first valve fitting. A second pressure gauge is fluidically coupled to the second injection conduit downstream from the second injection valve. The second pressure gauge monitors a second fluid pressure in the second valve fitting. Simultaneously flowing the cleaning fluid from the pressure vessel through the first injection conduit to the first valve fitting and through the second injection conduit to the second valve fitting can include, before opening the first injection valve, sensing a first injection conduit pressure with the first pressure gauge. The method includes determining that the first injection conduit pressure is less than the minimum injection pressure. The method includes, in response to determining that the first injection conduit pressure is less than the minimum injection pressure, opening the first injection valve positioned in the first injection conduit. The method includes sensing the first injection conduit pressure is at least the minimum injection pressure. The method includes, responsive to sensing the first injection conduit pressure is at least the minimum injection pressure, shutting the first injection valve. The method includes, simultaneously before opening the second injection valve, sensing a second injection conduit pressure with the second pressure gauge. The method includes determining that the second injection conduit pressure is less than the minimum injection pressure. The method includes, in response to determining that the second injection conduit pressure is less than the minimum injection pressure, opening the second injection valve positioned in the second injection conduit. The method includes sensing the second injection conduit pressure is at least the minimum injection pressure. The method includes, responsive to sensing the second injection conduit pressure is at least the minimum injection pressure, shutting the second injection valve. The method can include flowing the cleaning fluid from a cleaning fluid source through an input conduit into the pressure vessel.

The method includes responsive to flowing the cleaning fluid to the valve fitting, unblocking the first valve fitting. The method includes, responsive to flowing the cleaning fluid to the valve fitting, unblocking the second valve fitting.

The method can include opening a first injection valve positioned in the first injection conduit. The first injection valve controls cleaning fluid flow through the first injection conduit. The method includes, responsive to opening the first injection valve, flowing the cleaning fluid from the pressure vessel to the first valve fitting. The method includes shutting the first injection valve. The method includes, responsive to shutting the first injection valve, stopping flow of the cleaning fluid from the pressure vessel to the first valve fitting. The method includes simultaneously with opening the first injection valve, opening a second injection valve positioned in the second injection conduit configured to control cleaning fluid flow through the second injection conduit. The method includes, responsive to opening the second injection valve, flowing the cleaning fluid from the pressure vessel to the second valve fitting. The method includes shutting the second injection valve. The method includes, responsive to shutting the second injection valve, stopping flow of the cleaning fluid from the pressure vessel to the second valve fitting.

Pressurizing the pressure vessel can include, where the pressurizing vessel includes an input conduit to flow the cleaning fluid from a cleaning fluid source into the pressure vessel and where the pressurizing vessel includes a pressure vessel pressure gauge fluidically coupled to the pressure vessel, sensing, by the pressure vessel pressure gauge, pressure vessel pressure. The method includes determining that the pressure vessel pressure, by the pressure vessel pressure gauge, is less than or equal to a minimum injection pressure. The minimum injection pressure is a minimum pressure necessary to unblock multiple valve fittings simultaneously. In response to determining that the pressure vessel pressure is less than or equal to a minimum injection pressure, the method includes coupling a manual hand pump to the input conduit. The method includes opening an input pressure isolation valve positioned in input conduit. The method includes operating a manual hand pump coupled to the input conduit to raise the pressure vessel pressure to the minimum injection pressure. The method includes determining a pressure vessel pressure has reached at least the minimum injection pressure by the pressure vessel pressure gauge. In response to determining that the pressure vessel pressure has reached at least the minimum injection pressure, the method includes shutting the input pressure isolation valve to maintain the pressure vessel pressure at the minimum injection pressure. The method includes decoupling the manual hand pump from the input conduit.

The method can include decoupling a first injection conduit second end from the first valve fitting. The method can include decoupling a second injection conduit second end from the second valve fitting.

The method can include determining the first valve fitting and the second valve fitting are blocked to fluid flow through the valve. The method includes opening the first injection valve. The method includes flowing the cleaning fluid through the first injection conduit. The method includes sensing the first injection conduit pressure is at least the minimum injection pressure. The method includes shutting the first injection valve. The method includes sensing a first injection conduit pressure rate decrease over a time period. The method includes comparing the first injection conduit pressure rate decrease to a first injection conduit pressure rate threshold decrease. The method includes determining that the first injection conduit is blocked when the first injection conduit pressure rate decrease is less than the first injection conduit pressure rate threshold decrease. The method includes opening the second injection valve. The method includes flowing the cleaning fluid through the second injection conduit. The method includes sensing the second injection conduit pressure is at least the minimum injection pressure. The method includes shutting the second injection valve. The method includes sensing a second injection conduit pressure rate decrease over the time period. The method includes comparing the second injection conduit pressure rate decrease to a second injection conduit pressure rate threshold decrease. The method includes determining that the second injection conduit is blocked when the second injection conduit pressure rate decrease is equal to or less than the second injection conduit pressure rate threshold decrease.

The method can include determining the first valve fitting and the second valve fitting are unblocked to fluid flow through the valve. The method includes opening the first injection valve. The method includes flowing the cleaning fluid through the first injection conduit. The method includes sensing the first injection conduit pressure is at least the minimum injection pressure. The method includes shutting the first injection valve. The method includes sensing a first injection conduit pressure rate decrease over the time period. The method includes comparing the first injection conduit pressure rate decrease to a first injection conduit pressure rate threshold decrease. The method includes determining that the first injection conduit is unblocked when the first injection conduit pressure rate decrease is greater than the first injection conduit pressure rate threshold decrease. The method includes opening the second injection valve. The method includes flowing the cleaning fluid through the second injection conduit. The method includes sensing the second injection conduit pressure is at least the minimum injection pressure. The method includes shutting the second injection valve. The method includes sensing a second injection conduit pressure rate decrease over the time period. The method includes comparing the second injection conduit pressure rate decrease to a second injection conduit pressure rate threshold decrease. The method includes determining that the second injection conduit is unblocked when the second injection conduit pressure rate decrease is equal to or greater than the second injection conduit pressure rate threshold decrease.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION OF THE DISCLOSURE

The present disclosure relates to a method of using a tool to simultaneously unblock multiple valve fittings of a valve which are blocked to flow. Some examples of valves that can be blocked to flow are ball valves and gate valves. Valves have components such as valve seats or valve stems that can become blocked. Valve components can become blocked slowly due to corrosion of valve materials or due to buildup of organic or inorganic matter. For example, a valve can fail due to the inability of a valve to change position when operated due to corrosion on a valve stem of the valve. Also, valve components can become blocked by a larger particle or foreign object becoming lodged between components. These types of blockages can cause the blocked valve to fail to function as designed. Alternatively or in addition, a valve can fail because debris can become lodged in a valve seat of the valve resulting in a valve disk or gate's inability to fully shut. Valves can be equipped with a valve fitting fluidically coupled to the components to allow flow of a fluid from an external source to the component for the purpose of unblocking the component. For example, a valve stem fitting can flow fluid from the external source to the blocked area by the valve stem.

The tool that simultaneously unblocks multiple valve fittings includes a pressure vessel, an input conduit, a first injection conduit, and a second injection conduit. The pressure vessel holds a cleaning fluid at a pressure. The input conduit is fluidically coupled to the pressure vessel. When a cleaning fluid source is coupled to the input conduit, the input conduit flows the cleaning fluid from the cleaning fluid source to the pressure vessel. When a pressure source is connected to the input conduit, the pressure source adjusts a pressure of the pressure vessel. The first injection conduit has a first injection conduit first end mechanically coupled to the pressure vessel and a first injection conduit second end mechanically coupled to the first valve fitting. The first injection conduit flows the cleaning fluid from the pressure vessel to the first valve fitting. The second injection conduit has a second injection conduit first end mechanically coupled to the pressure vessel and a second injection conduit second end mechanically coupled to the second valve fitting. The second injection conduit flows the cleaning fluid from the pressure vessel to the second valve fitting. The blocked valve has a blocked first valve fitting and a blocked second valve fitting. The tool simultaneously flows the cleaning fluid from the pressure vessel through the first injection conduit to the first valve fitting blocked to flow and through the second injection conduit to the second valve fitting blocked to flow. The first valve fitting is unblocked in response to flowing the cleaning fluid to the first valve fitting. The second valve fitting is unblocked in response to flowing the cleaning fluid to the second valve fitting.

Implementations of the present disclosure realize one or more of the following advantages. The time required for valve maintenance can be reduced. For example, unblocking multiple blocked valve fittings on a valve simultaneously instead of sequentially can result in reduced equipment down time for maintenance. Valve operational time can be increased. For example, performing frequent cleanings can prevent valve damage that requires systems to be shut down and damaged or permanently blocked valves to be replaced. Additionally, valve life can be increased. For example, valves can be completely unblocking more frequently, and cleaning of valve components can be achieved. Also, equipment safety can be improved. For example, proper operation of a valve required for a safety barrier for a high pressure, high temperature, or hazardous fluid can be maintained.

Other advantages can include increased personnel safety. For example, the risk of equipment damage causing system failure can be reduced. Additionally, the tool and included components are sized so as to be small and portable. For example, the tool can more easily access difficult to reach valves such as in subsea application, congested areas, and high elevation areas.

Figure 1:
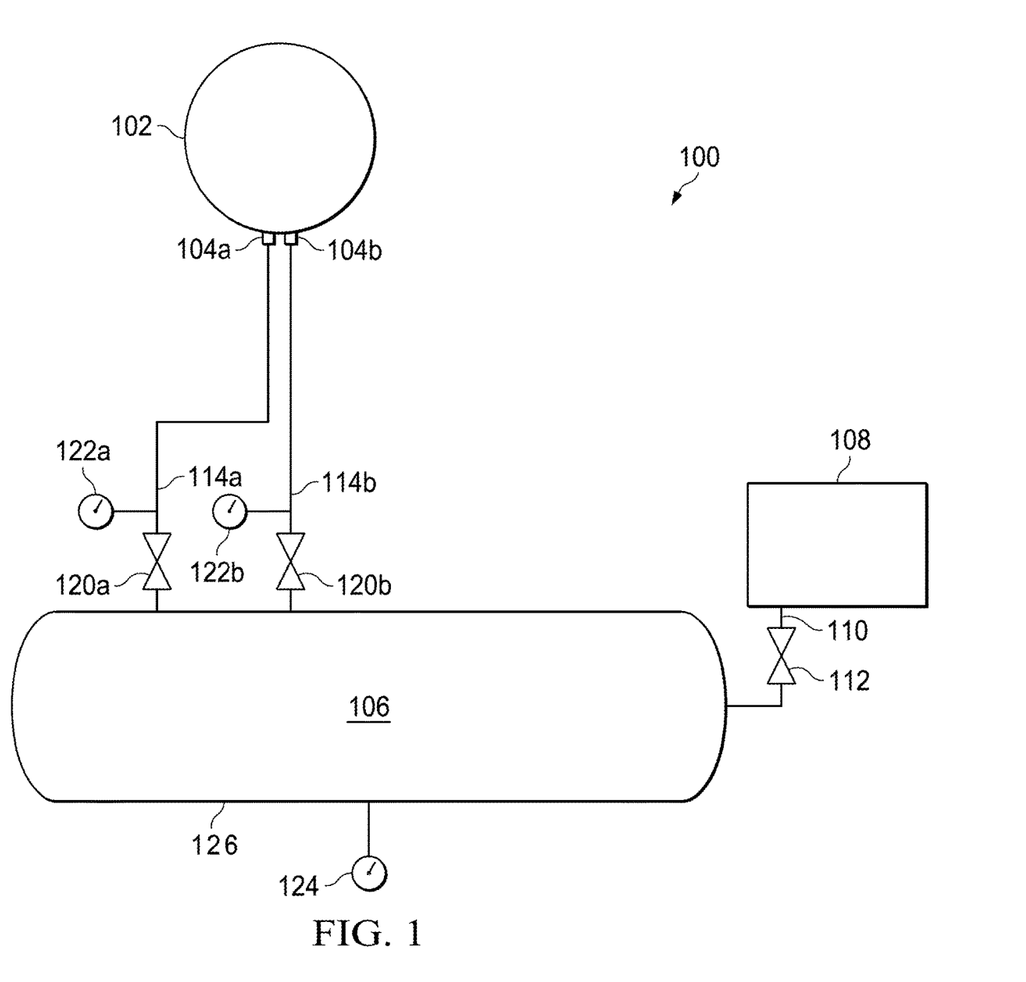
FIG. 1 is a schematic of a tool coupled to multiple valve fittings.

As shown in FIG. 1, a valve fitting unblocking tool 100 simultaneously unblocks a valve 102 with multiple valve fittings 104 blocked to flow. The first valve fitting blocked to flow is valve fitting 104a. The second valve fitting blocked to flow is valve fitting 104b. The valve fitting 104 prevents fluids from leaking out of a valve when sealed but allows fluid to flow into the valve when flushing the valve or out of the valve when bleeding the valve. For example, the valve fitting can be a screw-in connector or a nipple connector. As discussed earlier, the valve fittings 104 are connected to different parts of the valve 102 such as a valve body to block or bleed the valve, the valve seat, or the valve stem. Some examples of valves with valve fittings are ball valves and gate valves.

Figure 3:
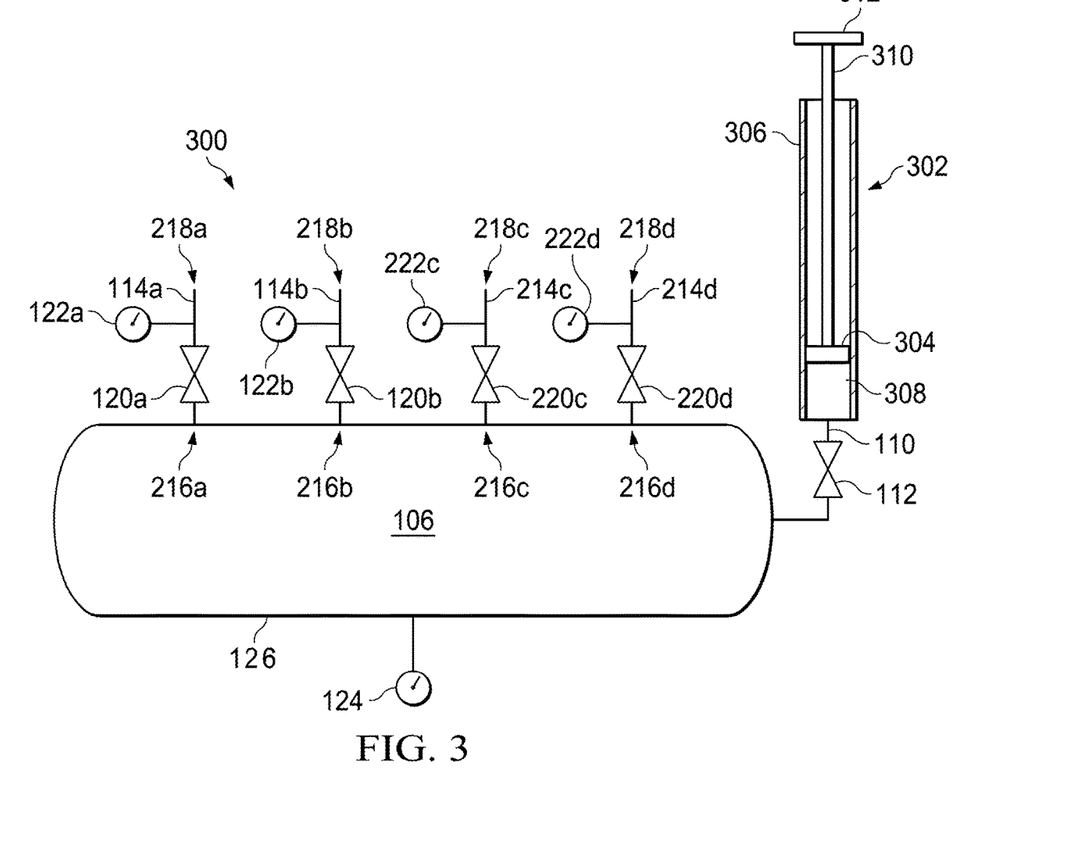
FIG. 3 is a schematic of the tool of FIG. 1 coupled to a manual hand pump.

The valve fitting unblocking tool 100 includes a pressure vessel 126. The pressure vessel 126 receives the cleaning fluid 106, holds the cleaning fluid 106, and supplies the cleaning fluid 106 to the valve fittings 104 blocked to flow. The pressure vessel 126 can be pressurized by an external pressure source, as shown in FIG. 3. The pressure vessel 126 can be pressurized to between 10,000 pounds per square inch (psi) to 30,000 psi. A typical operating pressure for the valve fitting unblocking tool can be 15,000 psi. The pressure vessel 126 can be a container or housing constructed of a metal, for example steel, a steel alloy, or aluminum and that is fluidically sealed. The pressure vessel 126 can be sized to have different capacities.

The pressure vessel 126 receives the cleaning fluid 106 from an external cleaning fluid source 108. The external cleaning fluid source 108 can be pressurized or un-pressurized depending on the pressure of the pressure vessel 126. For example, in a pressurized state, the cleaning fluid source 108 can inject the cleaning fluid 108 into the pressure vessel 126. In this example, the external cleaning fluid source 108 can be another pressure vessel such as a can of cleaning chemicals. Alternatively, in an un-pressurized state, the cleaning fluid source 108 can pour the cleaning fluid 108 into the pressure vessel 126. For example, the external cleaning fluid source 108 can be a capped fluid container.

The cleaning fluid 108 can be water, de-ionized water, or contain additional cleaning agents. Some examples of additional cleaning agents include specialized valve cleaner liquids. Valve cleaner liquids can have additional chemicals that react with the hardened material blocking the valve fittings 104 to dissolve the blockage. The unblocking process can require both high pressure and chemical reaction to clear the blockage. The valve fitting unblocking tool 100 can also be used to pressurize a valve sealant and lubricant.

An input conduit 110 is mechanically coupled to the pressure vessel 126. The input conduit 110 flows a fluid from the external source 108 into the pressure vessel 126. For example, the external source 108 can contain the cleaning fluid 106 and the input conduit 110 can flow the cleaning fluid 106 from the external source 108 into the pressure vessel 126. Alternatively or in addition, the external source 108 contain pressurized gas such as air or nitrogen and the input conduit 110 and the input conduit can flow the pressurized gas from the external source 108 into the pressure vessel 126 to adjust a pressure of the pressure vessel 126. For example, the external source 108 can be a manual hand pump 302, as shown in FIG. 3, to increase the pressure of the cleaning fluid 106 in the pressure vessel 126. Referring to FIG. 3, the manual hand pump 302 is a piston type pump with a piston 304 positioned within a pump body 306. The piston 304 moves within the pump body 306 to compress the fluid within a volume 308 defined by the piston body 306 and piston 304. The piston 304 is moved by a piston rod 310 connected to a handle 312. The handle 312 is moved by an operator. The input conduit 110 can be a solid metal pipe, a braided metal hose, or a synthetic hose. The input conduit 110 can include a fitting (not shown) to couple the input conduit to the external source. For example, the fitting can be a screw-in connector or a nipple connector.

Referring to FIG. 1, the input conduit 110 can include an input isolation valve 112 to control flow through the input conduit 110. For example, the input isolation valve 112 can be a ball valve that when in an open position allows flow of the fluid from the external source 108 to the pressure vessel 126 and when in a shut position stops flow of the fluid from the external source 108 to the pressure vessel 126.

Figure 2:
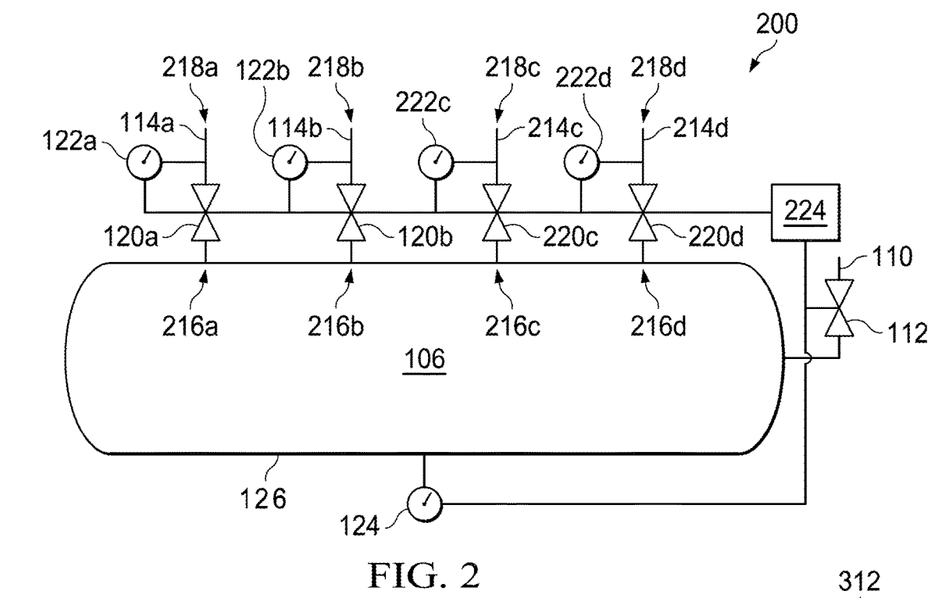
FIG. 2 is a schematic view of another tool configured to clean multiple valve fittings.

Multiple injection conduits are mechanically and fluidically coupled to the pressure vessel 126. The injection conduits flow pressurized cleaning fluid 106 from the pressure vessel 126 to multiple valve fittings simultaneously. The first injection conduit 114a flows the pressurized cleaning fluid 106 from the pressure vessel 126 to the first valve fitting 104a. The second injection conduit 114b flows the pressurized cleaning fluid 106 from the pressure vessel 126 to the second valve fitting 104b. As shown in FIG. 2, the valve fitting unblocking tool 200 can include more than two injection conduits. For example, the valve fitting unblocking tool 200 has a third injection conduit 114c that flows the pressurized cleaning fluid 106 from the pressure vessel 126 to a third valve fitting (not shown). Additionally, valve fitting unblocking tool 200 has a fourth injection conduit 114d that flows the pressurized cleaning fluid 106 from the pressure vessel 126 to a fourth valve fitting (not shown).

Referring to FIG. 2, the injection conduits have a first end and a second end. The first end is mechanically and fluidically coupled to the pressure vessel 126 and the second end is coupled to the valve fitting. The first injection conduit 114a is mechanically and fluidically coupled to the pressure vessel 126 by the first end 216a. The first injection conduit 114a is mechanically and fluidically coupled to the first valve fitting 104a by the second end 218a. The second injection conduit 114a is mechanically and fluidically coupled to the pressure vessel 126 by the first end 216a. The second injection conduit 114a is mechanically and fluidically coupled to the second valve fitting 104a by the second end 218a. The third injection conduit 214c is mechanically and fluidically coupled to the pressure vessel 126 by the first end 216c. The third injection conduit 214c is mechanically and fluidically coupled to the third valve fitting (not shown) by the second end 118c. The fourth injection conduit 114d is mechanically and fluidically coupled to the pressure vessel 126 by the first end 216d. The fourth injection conduit 114d is mechanically and fluidically coupled to the fourth valve fitting 2 (not shown) by the first end 216d.

As shown in FIG. 1, each injection conduit can include an isolation valve positioned in the respective injection conduit to control the flow of fluid through the respective injection conduit. The isolation valves are operated simultaneously to flow the cleaning fluid 106 from the pressure vessel 126 to the blocked valve fittings. A first isolation valve 120a controls the flow of fluid through the first injection conduit 114a. A second isolation valve 120b controls the flow of fluid through the second injection conduit 114b. Referring to FIG. 2, a third isolation valve 220b controls the flow of fluid through the third injection conduit 214c. A fourth isolation valve 220d controls the flow of fluid through the fourth injection conduit 214d. The isolation valves (120a, 120b, 220c, and 220d) can be a ball valve that when in an open position allows flow of the fluid from the pressure vessel 126 to the respective valve fitting 104a, 104b, and the third valve fitting and the fourth valve fitting (not shown) and when in a shut position stops flow of the fluid from the pressure vessel 126 to the respective valve fitting 104a, 104b, and the third valve fitting and the fourth valve fitting (not shown).

Each injection conduit can include a pressure gauge fluidically coupled to the injection conduit to sense the pressure of the cleaning fluid 106. The pressure gauges are positioned in the downstream direction from both the pressure vessel 126 and the isolation valve, toward the valve fitting. The downstream direction is the direction of fluid flow from the pressure vessel 126 toward the valve 102. For example, a first pressure gauge 122a is fluidically coupled to injection conduit 114a to sense the pressure of the cleaning fluid 106 in injection conduit 114a. Similarly, a second pressure gauge 122b is fluidically coupled to injection conduit 114b to sense the pressure of the cleaning fluid 106 in injection conduit 114b. Referring to FIG. 2, a third pressure gauge 222c is fluidically coupled to injection conduit 214c to sense the pressure of the cleaning fluid 106 in injection conduit 214c. Likewise, a fourth pressure gauge 222d is fluidically coupled to injection conduit 214d to sense the pressure of the cleaning fluid 106 in injection conduit 214c.

A pressure vessel pressure gauge 124 can be fluidically coupled to the pressure vessel 126. The pressure vessel pressure gauge 124 senses the pressure in the pressure vessel 126. When the pressure vessel 126 contains cleaning fluid 106, the pressure vessel pressure gauge 126 senses the pressure of the cleaning fluid 106 in the pressure vessel 126.

The valve fitting unblocking tool 100 can include a controller 224 as shown in FIG. 2. In some implementations, the controller 224 is a non-transitory computer-readable medium storing instructions executable by one or more processors to perform operations described herein. In some implementations, the controller includes firmware, software, hardware, or combinations of them. The instructions, when executed by the one or more computer processors, cause the one or more computer processors to unblock multiple valve fittings with the valve fitting unblocking tool. The controller 224 is operatively coupled to the various valves described herein. The controller 224 also receives signals representing conditions from the various sensors described herein.

The controller 224 is operatively coupled to the input isolation valve 112 to control flow through the input conduit 110. The controller 224 commands the input isolation valve 112 to open, allowing flow or to close, stopping flow through the input conduit 110. In the same way, the controller 224 is operative coupled to the first isolation valve 120a, the second isolation valve 120b, the third isolation valve 220c, and the fourth isolation valve 220d. The controller 224 commands the first isolation valve 120a to open, allowing flow or to close, stopping flow through the first injection conduit 114a. The controller 224 commands the second isolation valve 120b to open, allowing flow or to close, stopping flow through the second injection conduit 114b. The controller 224 commands the third isolation valve 220c to open, allowing flow or to close, stopping flow through the third injection conduit 214c. The controller 224 commands the fourth isolation valve 220d to open, allowing flow or to close, stopping flow through the fourth injection conduit 214d.

The controller 224 receives a signal from the pressure vessel pressure gauge 124 representing the pressure vessel 126. The controller 224 receives a signal from the first pressure gauge 122a representing the pressure of the cleaning fluid 106 in injection conduit 114a. Similarly, the controller 224 receives a signal from the second pressure gauge 122b representing the pressure of the cleaning fluid 106 in injection conduit 114b. Referring to FIG. 2, the controller 224 receives a signal from the third pressure gauge 222c representing the pressure of the cleaning fluid 106 in injection conduit 214c. Likewise, the controller 224 receives a signal from the fourth pressure gauge 222d representing the pressure of the cleaning fluid 106 in injection conduit 214c.

The controller 224 can control the process of pressurizing the pressure vessel. The pressure vessel pressure gauge 124 senses the pressure vessel pressure. The pressure vessel pressure gauge 124 transmits a signal representing the pressure vessel pressure to the controller 224. The controller 224 then determines when the pressure vessel pressure is less than or equal to a minimum injection pressure. In response to determining that the pressure vessel pressure is less than or equal to a minimum injection pressure, the controller 224 opens the input pressure isolation valve 112 allowing flow of the pressurized cleaning fluid into the pressure vessel 126. Alternatively, the manual hand pump 108, shown in FIG. 3, is operated to raise the pressure vessel pressure to the minimum injection pressure. The controller 224 determines that a pressure vessel 126 pressure has reached at least the minimum injection pressure by receiving signals from the pressure vessel pressure gauge 124. In response to determining that the pressure vessel 126 pressure has reached at least the minimum injection pressure, the controller 224 shuts the input pressure isolation valve 112 to maintain the pressure vessel 126 pressure at the minimum injection pressure.

The controller 224 can simultaneously flow the cleaning fluid from the pressure vessel 126 through the first injection conduit 114a to the first valve fitting 104a and through the second injection conduit 114b to the second valve fitting 104b. The first pressure gauge 122a samples the first fluid pressure in the first valve fitting 104a and transmits a signal representing the first fluid pressure to the controller 224. The second pressure gauge 122b samples a second fluid pressure in the second valve fitting 104b and transmits a signal representing the second fluid pressure to the controller 224. The controller 224 receives the first injection conduit 114a pressure and the second injection 114b conduit pressure. The controller 224 determines that the first injection conduit 114a pressure is less than the minimum injection pressure. In response to determining that the first injection conduit 114a pressure is less than the minimum injection pressure, the controller 224 opens the first injection valve 120a positioned in the first injection conduit 114a. The controller 224 senses when the first injection conduit 114a pressure is at least the minimum injection pressure. Responsive to sensing the first injection conduit 114a pressure is at least the minimum injection pressure, the controller 224 shuts the first injection valve 120a. Simultaneously before the controller 224 opens the second injection valve 120b, the controller 224 receives a second injection conduit 114b pressure sensed with the second pressure gauge 122b. The controller 224 determines that the second injection conduit 114b pressure is less than the minimum injection pressure. In response to determining that the second injection conduit 114b pressure is less than the minimum injection pressure; the controller 224 opens the second injection valve 120b positioned in the second injection conduit 114b. The controller 224 compares the signal representing the second injection conduit 114b pressure to the minimum injection pressure. The controller 224 determines when the second injection conduit 114b pressure is at least the minimum injection pressure. Responsive to determining that the second injection conduit 114b pressure is at least the minimum injection pressure, the controller 224 shuts the second injection valve 114b.

The controller 224 can determine when the first valve fitting 104a and the second valve fitting 104b are blocked to fluid flow through the valve 102. The controller 224 opens the first injection valve 120a. The cleaning fluid 106 is flowed through the first injection conduit 114a. The controller 224 receives a signal representing the first injection conduit 114a pressure, which is compared to the minimum injection pressure. The controller 224 determines when the first injection conduit 114a is at least the minimum injection pressure. The controller 224 shuts the first injection valve. The controller 224 receives signals representing the first injection conduit 114a over time. The controller 224 determines the first injection conduit 114a pressure rate decrease over a time period. The controller 224 compares the first injection conduit 114a pressure rate decrease to a first injection conduit 114a pressure rate threshold decrease. The controller 224 determines that the first injection conduit 114a is blocked when the first injection conduit 114a pressure rate decrease is less than the first injection conduit 114a pressure rate threshold decrease. The controller 224 opens the second injection valve 120b. The cleaning fluid 106 is flowed through the second injection conduit 114b. The controller 224 receives a signal representing the second injection conduit 114b pressure and compares the second injection conduit 114b pressure to the minimum injection pressure. When the controller 224 determines that the second injection conduit 114b pressure is at least the minimum injection pressure, the controller 224 shuts the second injection valve 120b. The controller 224 determines a second injection conduit 114b pressure rate decrease over the time period. The controller 224 compares the second injection conduit 114b pressure rate decrease to a second injection conduit 114b pressure rate threshold decrease. The controller 224 determines the second injection conduit 114b to be blocked when the second injection conduit 114b pressure rate decrease is equal to or less than the second injection conduit 114b pressure rate threshold decrease.

The controller 224 can determine when the first valve fitting 104a and the second valve fitting 104b are unblocked to fluid flow through the valve 102. The controller 224 opens the first injection valve 120a. The cleaning fluid 106 is flowed through the first injection conduit 114a. The controller 224 receives a signal from the first pressure gauge 122a representing the first injection conduit 114a pressure. The controller 224 determines that the first injection conduit 114a pressure is at least the minimum injection pressure. The controller 224 shuts the first injection valve 102a. The controller 224 continues to receive signals representing the first injection conduit pressure. The controller 224 determines a first injection conduit 114a pressure rate decrease over the time period. The controller 224 compares the first injection conduit 114a pressure rate decrease to a first injection conduit 114a pressure rate threshold decrease. The controller 224 determines that the first injection conduit 114a is unblocked when the first injection conduit 114a pressure rate decrease is greater than the first injection conduit 114a pressure rate threshold decrease. The controller 224 opens the second injection valve 120b. The cleaning fluid 106 is flowed through the second injection conduit 114b. The controller 224 receives a signal representing the second injection conduit 114b pressure and compares the second injection conduit 114b pressure to the minimum injection pressure. The controller 224 determines that the second injection conduit 114b pressure is at least the minimum injection pressure. The controller 224 shuts the second injection valve. The controller 224 continues to receive the signal representing the second injection conduit 114b pressure. The controller 224 determines a second injection conduit 114b pressure rate decrease over the time period. The controller 224 compares the second injection conduit 114b pressure rate decrease to a second injection conduit 114b pressure rate threshold decrease. The controller 224 determines that the second injection conduit 114b is unblocked when the second injection conduit 114b pressure rate decrease is equal to or greater than the second injection conduit 114b pressure rate threshold decrease.

Figure 4:
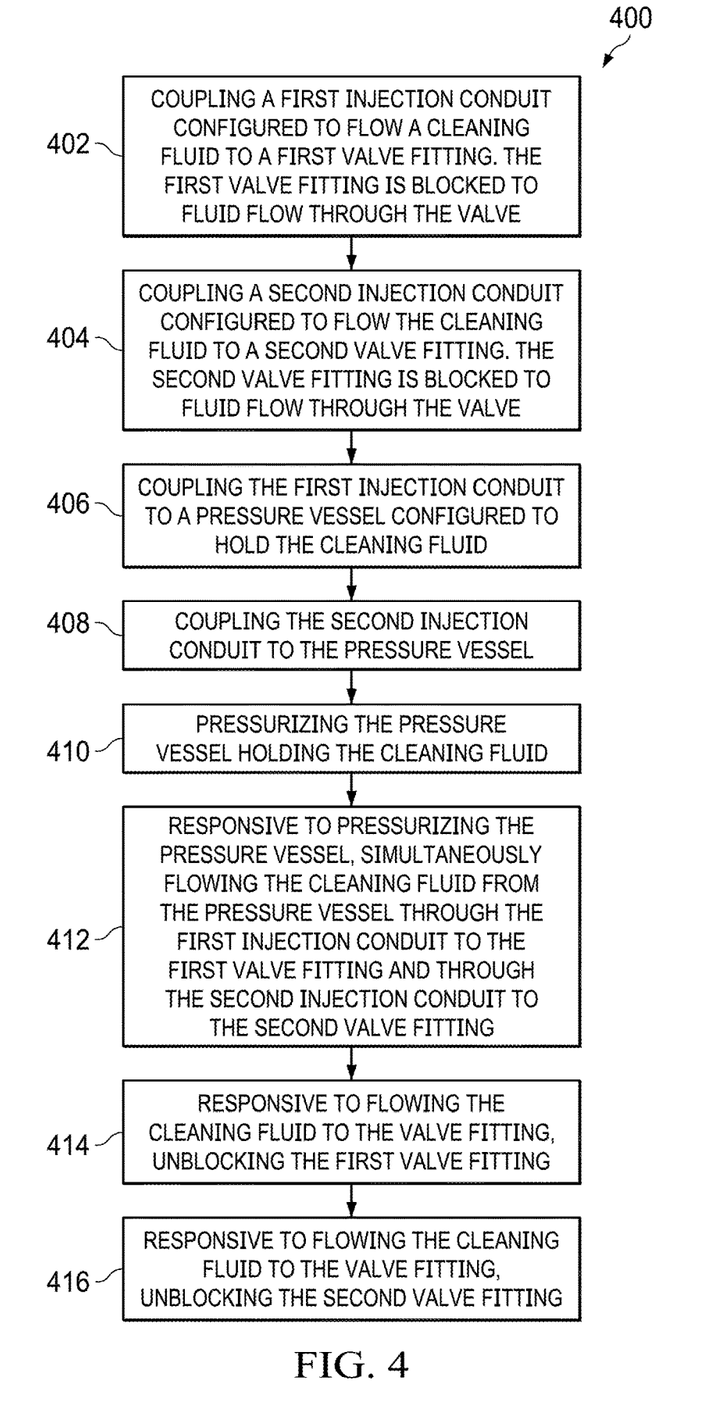
FIG. 4 is a flow chart of an example method of simultaneously cleaning multiple valve fittings.

FIG. 4 is a flow chart of an example method 400 of unblocking multiple valve fittings with the valve fitting unblocking tool. At 402, a first injection conduit configured to flow a cleaning fluid is coupling to a first valve fitting. The first valve fitting is blocked to fluid flow through the valve.

At 404, a second injection conduit configured to flow the cleaning fluid is couple to a second valve fitting. The second valve fitting is blocked to fluid flow through the valve. At 406, the first injection conduit is coupled to a pressure vessel configured to hold the cleaning fluid. The cleaning fluid can be flowed from a cleaning fluid source through an input conduit into the pressure vessel. At 408, the second injection conduit is coupled to the pressure vessel. At 410, the pressure vessel holding the cleaning fluid is pressurized.

At 412, responsive to pressurizing the pressure vessel, the cleaning fluid from the pressure vessel is simultaneously flowed through the first injection conduit to the first valve fitting and through the second injection conduit to the second valve fitting. The cleaning fluid from the pressure vessel can be simultaneously flowed through the first injection conduit to the first valve fitting by opening a first injection valve positioned in the first injection conduit. The first injection valve is configured to control cleaning fluid flow through the first injection conduit. Responsive to opening the first injection valve, the cleaning fluid is flowed from the pressure vessel to the first valve fitting. Then, the first injection valve is shut. Responsive to shutting the first injection valve, flow of the cleaning fluid is stopped from the pressure vessel to the first valve fitting. Simultaneously with opening the first injection valve, a second injection valve positioned in the second injection conduit configured to control cleaning fluid flow through the second injection conduit is opened. Responsive to opening the second injection valve, the cleaning fluid from the pressure vessel is flowed to the second valve fitting. Then, the second injection valve is shut. Responsive to shutting the second injection valve, flow of the cleaning fluid from the pressure vessel to the second valve fitting is stopped.

Pressurizing the pressure vessel, where the pressurizing vessel includes an input conduit configured to flow the cleaning fluid from a cleaning fluid source into the pressure vessel and a pressure vessel pressure gauge fluidically coupled to the pressure vessel, can include sensing, by the pressure vessel pressure gauge, pressure vessel pressure. Pressurizing the pressure vessel can then include determining that the pressure vessel pressure, by the pressure vessel pressure gauge, is less than or equal to a minimum injection pressure. The minimum injection pressure is a minimum pressure necessary to unblock multiple valve fittings simultaneously. In response to determining that the pressure vessel pressure is less than or equal to a minimum injection pressure, a manual hand pump is coupled to the input conduit. An input pressure isolation valve positioned in input conduit is opened. A manual hand pump coupled to the input conduit is operated to raise the pressure vessel pressure to the minimum injection pressure. It is determined that a pressure vessel pressure has reached at least the minimum injection pressure by the pressure vessel pressure gauge. In response to determining that the pressure vessel pressure has reached at least the minimum injection pressure, the input pressure isolation valve is shut to maintain the pressure vessel pressure at the minimum injection pressure. The manual hand pump is decoupled from the input conduit.

Simultaneously flowing the cleaning fluid from the pressure vessel through the first injection conduit to the first valve fitting and through the second injection conduit to the second valve fitting can include where a first pressure gauge is fluidically coupled to the first injection conduit downstream from the first injection valve. Downstream from the first injection valve is away from the pressure vessel. The first pressure gauge is configured to monitor a first fluid pressure in the first valve fitting. A second pressure gauge is fluidically coupled to the second injection conduit downstream from the second injection valve. The second pressure gauge is configured to monitor a second fluid pressure in the second valve fitting. A first injection conduit pressure is sensed with the first pressure gauge. It is determined that the first injection conduit pressure is less than the minimum injection pressure. In response to determining that the first injection conduit pressure is less than the minimum injection pressure; the first injection valve positioned in the first injection conduit is opened. It is sensed that the first injection conduit pressure is at least the minimum injection pressure. Responsive to sensing the first injection conduit pressure is at least the minimum injection pressure, the first injection valve is shut. Simultaneously before opening the second injection valve, a second injection conduit pressure is sensed with the second pressure gauge. It is determined that the second injection conduit pressure is less than the minimum injection pressure. In response to determining that the second injection conduit pressure is less than the minimum injection pressure; the second injection valve positioned in the second injection conduit is opened. It is sensed that the second injection conduit pressure is at least the minimum injection pressure. Responsive to sensing the second injection conduit pressure is at least the minimum injection pressure, the second injection valve is shut.

The method can further include determining that the first valve fitting and the second valve fitting are blocked to fluid flow through the valve. The first injection valve is opened. The cleaning fluid is flowed through the first injection conduit. The first injection conduit pressure is sensed to be at least the minimum injection pressure. The first injection valve is shut. A first injection conduit pressure rate decrease over a time period is sensed. The first injection conduit pressure rate decrease is compared to a first injection conduit pressure rate threshold decrease. It is determined that the first injection conduit is blocked when the first injection conduit pressure rate decrease is less than the first injection conduit pressure rate threshold decrease. The second injection valve is opened. The cleaning fluid is flowed through the second injection conduit. The second injection conduit pressure is sensed to be at least the minimum injection pressure. The second injection valve is shut. A second injection conduit pressure rate decrease over the time period is sensed. The second injection conduit pressure rate decrease is compared to a second injection conduit pressure rate threshold decrease. The second injection conduit is determined to be blocked when the second injection conduit pressure rate decrease is equal to or less than the second injection conduit pressure rate threshold decrease.

The method can further include determining the first valve fitting and the second valve fitting are unblocked to fluid flow through the valve. The first injection valve is opened. The cleaning fluid is flowed through the first injection conduit. The first injection conduit pressure is sensed to be at least the minimum injection pressure. The first injection valve is shut. A first injection conduit pressure rate decrease over the time period is sensed. The first injection conduit pressure rate decrease is compared to a first injection conduit pressure rate threshold decrease. The first injection conduit is determined to be unblocked when the first injection conduit pressure rate decrease is greater than the first injection conduit pressure rate threshold decrease. The second injection valve is opened. The cleaning fluid is flowed through the second injection conduit. The second injection conduit pressure is sensed to be at least the minimum injection pressure. The second injection valve is shut. A second injection conduit pressure rate decrease over the time period is sensed. The second injection conduit pressure rate decrease is compared to a second injection conduit pressure rate threshold decrease. The second injection conduit is determined to be unblocked when the second injection conduit pressure rate decrease is equal to or greater than the second injection conduit pressure rate threshold decrease.

At 414, responsive to flowing the cleaning fluid to the valve fitting, the first valve fitting is unblocked and responsive to flowing the cleaning fluid to the valve fitting, the second valve fitting is unblocked. A first injection conduit second end can be decoupled from the first valve fitting and a second injection conduit second end can be decoupled from the second valve fitting.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A method comprising:
coupling a first injection conduit configured to flow a cleaning fluid to a first valve fitting, the first valve fitting blocked to fluid flow through the first valve fitting;
coupling a second injection conduit configured to flow the cleaning fluid to a second valve fitting, the second valve fitting blocked to fluid flow through the second valve fitting;
coupling the first injection conduit to a pressure vessel at a first location, the pressure vessel holding the cleaning fluid;
coupling the second injection conduit to the pressure vessel at a second location different than the first location;
pressurizing the pressure vessel holding the cleaning fluid;
performing a first process comprising flowing the cleaning fluid from the pressure vessel through the first injection conduit to the first valve fitting and performing a second process simultaneous with the first process, the second process comprising flowing the cleaning fluid from the pressure vessel through the second injection conduit to the second valve fitting;
responsive to flowing the cleaning fluid from the first location to the first valve fitting, unblocking the first valve fitting; and
responsive to flowing the cleaning fluid from the second location to the second valve fitting, unblocking the second valve fitting
wherein performing the first process comprising flowing the cleaning fluid from the pressure vessel through the first injection conduit to the first valve fitting comprises:
before opening a first injection valve positioned in the first injection conduit, sensing a first injection conduit pressure with a first pressure gauge coupled to the first injection conduit downstream from the first injection valve, wherein downstream from the first injection valve is away from the pressure vessel;
determining when the first injection conduit pressure is less than a minimum injection pressure, wherein the minimum injection pressure is a minimum pressure necessary to simultaneously unblock the first valve fitting and the second valve fitting;
responsive to determining when the first injection conduit pressure is less than the minimum injection pressure, opening the first injection valve positioned in the first injection conduit;
sensing the first injection conduit pressure is at least the minimum injection pressure;
responsive to sensing the first injection conduit pressure is at least the minimum injection pressure, shutting the first injection valve;
opening the first injection valve positioned in the first injection conduit;
responsive to opening the first injection valve, flowing the cleaning fluid from the pressure vessel to the first valve fitting;
shutting the first injection valve;
responsive to shutting the first injection valve, stopping flow of the cleaning fluid from the pressure vessel to the first valve fitting;
wherein performing the second process comprising flowing the cleaning fluid from the pressure vessel through the second injection conduit to the second valve fitting comprises:
before opening a second injection valve positioned in the second injection conduit, sensing a second injection conduit pressure with a second pressure gauge coupled to the second injection conduit downstream from the second injection valve, wherein downstream from the second injection valve is away from the pressure vessel;
determining when the second injection conduit pressure is less than the minimum injection pressure;
responsive to determining when the second injection conduit pressure is less than the minimum injection pressure, opening the second injection valve positioned in the second injection conduit;
sensing the second injection conduit pressure is at least the minimum injection pressure;
responsive to sensing the second injection conduit pressure is at least the minimum injection pressure, shutting the second injection valve;
opening the second injection valve positioned in the second injection conduit;
responsive to opening the second injection valve, flowing the cleaning fluid from the pressure vessel to the second valve fitting;
shutting the second injection valve;
responsive to shutting the second injection valve, stopping flow of the cleaning fluid from the pressure vessel to the second valve fitting.

2. The method of claim 1, further comprising coupling an input conduit to an input fitting of the pressure vessel.

3. The method of claim 2, further comprising coupling a cleaning fluid source to the input conduit.

4. The method of claim 3, wherein the cleaning fluid source is unpressurized.

5. The method of claim 3, further comprising flowing the cleaning fluid from the cleaning fluid source to the pressure vessel.

6. The method of claim 5, wherein flowing the cleaning fluid from the cleaning fluid source to the pressure vessel comprises opening and shutting an input isolation valve coupled to the input conduit.

7. The method of claim 6, further comprising coupling a third pressure gauge to the pressure vessel.

8. The method of claim 7, wherein pressurizing the pressure vessel further comprises:
sensing, by the third pressure gauge, a pressure of the pressure vessel;
determining when the pressure of the pressure vessel, sensed by the third pressure gauge, is less than the minimum injection pressure;
responsive to determining when the pressure of the pressure vessel is less than the minimum injection pressure, coupling an external pressure source to the input conduit;
opening the input isolation valve coupled to the input conduit;
responsive to opening the input isolation valve, pressurizing the pressure vessel;
determining the pressure of the pressure vessel has reached at least the minimum injection pressure by sensing with the third pressure gauge;
responsive to determining when the pressure of the pressure vessel has reached at least the minimum injection pressure, shutting the input isolation valve to maintain the pressure of the pressure vessel; and
decoupling the external pressure source from the input conduit.

9. The method of claim 1, further comprising, before pressurizing the pressure vessel holding the cleaning fluid:
fluidically coupling the first pressure gauge to the first injection conduit downstream from the first injection valve, the first pressure gauge configured to monitor a first fluid pressure in the first valve fitting; and
fluidically coupled the second pressure gauge to the second injection conduit downstream from the second injection valve, the second pressure gauge configured to monitor a second fluid pressure in the second valve fitting.

10. The method of claim 1, further comprising:
decoupling the first injection conduit from the first valve fitting; and
decoupling the second injection conduit from the second valve fitting.

11. The method of claim 1, further comprising determining the first valve fitting and the second valve fitting are blocked to fluid flow by:
opening the first injection valve;
flowing the cleaning fluid through the first injection conduit;
sensing the first injection conduit pressure is at least the minimum injection pressure;
shutting the first injection valve;
sensing a first injection conduit pressure rate decrease over a time period;
comparing the first injection conduit pressure rate decrease to a first injection conduit pressure rate threshold decrease;
determining when the first injection conduit is blocked when the first injection conduit pressure rate decrease is less than the first injection conduit pressure rate threshold decrease;
opening the second injection valve;
flowing the cleaning fluid through the second injection conduit;
sensing the second injection conduit pressure is at least the minimum injection pressure;
shutting the second injection valve;
sensing a second injection conduit pressure rate decrease over the time period;
comparing the second injection conduit pressure rate decrease to a second injection conduit pressure rate threshold decrease; and
determining when the second injection conduit is blocked when the second injection conduit pressure rate decrease is equal to or less than the second injection conduit pressure rate threshold decrease.

12. The method of claim 11, further comprising determining the first valve fitting and the second valve fitting are unblocked to fluid flow by:
opening the first injection valve;
flowing the cleaning fluid through the first injection conduit;
sensing the first injection conduit pressure is at least the minimum injection pressure;
shutting the first injection valve;
sensing the first injection conduit pressure rate decrease over the time period;
comparing the first injection conduit pressure rate decrease to the first injection conduit pressure rate threshold decrease;
determining when the first injection conduit is unblocked when the first injection conduit pressure rate decrease is greater than the first injection conduit pressure rate threshold decrease;
opening the second injection valve;
flowing the cleaning fluid through the second injection conduit;
sensing the second injection conduit pressure is at least the minimum injection pressure;
shutting the second injection valve;
sensing the second injection conduit pressure rate decrease over the time period;
comparing the second injection conduit pressure rate decrease to the second injection conduit pressure rate threshold decrease; and
determining when the second injection conduit is unblocked when the second injection conduit pressure rate decrease is equal to or greater than the second injection conduit pressure rate threshold decrease.

13. A method comprising:
coupling a first injection conduit configured to flow a cleaning fluid to a first valve fitting, the first valve fitting blocked to fluid flow through the first valve fitting;
coupling a second injection conduit configured to flow the cleaning fluid to a second valve fitting, the second valve fitting blocked to fluid flow through the second valve fitting;
coupling the first injection conduit to a pressure vessel at a first location, the pressure vessel holding the cleaning fluid;
coupling the second injection conduit to the pressure vessel at a second location different than the first location;
coupling a first end of an input conduit to the pressure vessel and coupling a second end of the input conduit to a cleaning fluid source containing the cleaning fluid, the input conduit comprising an isolation valve, wherein the cleaning fluid source comprises a manual hand pump comprising a pump body, a piston positioned within the pump body, and a handle coupled to the piston, the manual hand pump configured to compress the cleaning fluid within a volume defined by the pump body and the piston;

pressurizing the pressure vessel holding the cleaning fluid by flowing the cleaning fluid from the cleaning fluid source to the pressure vessel, wherein flowing the cleaning fluid from the cleaning fluid source to the pressure vessel comprises opening the isolation valve in the input conduit and operating the manual hand pump to pump the cleaning fluid from the pump body into the pressure vessel;

performing a first process comprising flowing the cleaning fluid from the pressure vessel through the first injection conduit to the first valve fitting and performing a second process simultaneous with the first process, the second process comprising flowing the cleaning fluid from the pressure vessel through the second injection conduit to the second valve fitting;

responsive to flowing the cleaning fluid from the first location to the first valve fitting, unblocking the first valve fitting; and responsive to flowing the cleaning fluid from the second location to the second valve fitting, unblocking the second valve fitting.

14. The method of claim 13, wherein performing the first process comprising flowing the cleaning fluid from the pressure vessel through the first injection conduit to the first valve fitting comprises:

opening a first injection valve positioned in the first injection conduit, the first injection valve configured to control cleaning fluid flow through the first injection conduit;

responsive to opening the first injection valve, flowing the cleaning fluid from the pressure vessel to the first valve fitting;

shutting the first injection valve;

responsive to shutting the first injection valve, stopping flow of the cleaning fluid from the pressure vessel to the first valve fitting;

wherein performing the second process comprising flowing the cleaning fluid from the pressure vessel through the second injection conduit to the second valve fitting comprises:

simultaneously with opening the first injection valve, opening a second injection valve positioned in the second injection conduit configured to control cleaning fluid flow through the second injection conduit;

responsive to opening the second injection valve, flowing the cleaning fluid from the pressure vessel to the second valve fitting;

shutting the second injection valve; and responsive to shutting the second injection valve, stopping flow of the cleaning fluid from the pressure vessel to the second valve fitting.

15. The method of claim 13, wherein the cleaning fluid source is initially unpressurized.

16. The method of claim 13, further comprising coupling a third pressure gauge to the pressure vessel.

17. The method of claim 16, wherein pressurizing the pressure vessel further comprises:

sensing, by the third pressure gauge, a pressure of the pressure vessel;

determining when the pressure of the pressure vessel, sensed by the third pressure gauge, is less than a minimum injection pressure, which is a minimum pressure necessary to unblock the first valve fitting and the second valve fitting simultaneously;

responsive to determining when the pressure of the pressure vessel is less than the minimum injection pressure, opening the isolation valve in the input conduit and operating the manual hand pump to pump the cleaning fluid from the pump body into the pressure vessel;

responsive to pumping the cleaning fluid into the pressure vessel, pressurizing the pressure vessel;

determining the pressure of the pressure vessel has reached at least the minimum injection pressure by sensing with the third pressure gauge;

responsive to determining when the pressure of the pressure vessel has reached at least the minimum injection pressure, shutting the isolation valve to maintain the pressure of the pressure vessel; and decoupling the manual hand pump from the input conduit.

18. The method of claim 13, further comprising:

decoupling the first injection conduit from the first valve fitting; and decoupling the second injection conduit from the second valve fitting.

19. The method of claim 14, further comprising determining the first valve fitting and the second valve fitting are blocked to fluid flow by:

opening the first injection valve;

flowing the cleaning fluid through the first injection conduit;

sensing a first injection conduit pressure is at least a minimum injection pressure, wherein the minimum injection pressure is a minimum pressure necessary to unblock the first valve fitting and the second valve fitting simultaneously;

shutting the first injection valve;

sensing a first injection conduit pressure rate decrease over a time period;

comparing the first injection conduit pressure rate decrease to a first injection conduit pressure rate threshold decrease;

determining when the first injection conduit is blocked when the first injection conduit pressure rate decrease is less than the first injection conduit pressure rate threshold decrease;

opening the second injection valve;

flowing the cleaning fluid through the second injection conduit;

sensing a second injection conduit pressure is at least the minimum injection pressure;

shutting the second injection valve;

sensing a second injection conduit pressure rate decrease over the time period;

comparing the second injection conduit pressure rate decrease to a second injection conduit pressure rate threshold decrease; and determining when the second injection conduit is blocked when the second injection conduit pressure rate decrease is equal to or less than the second injection conduit pressure rate threshold decrease.

20. The method of claim 19, further comprising determining the first valve fitting and the second valve fitting are unblocked to fluid flow by:

opening the first injection valve;

flowing the cleaning fluid through the first injection conduit;

sensing the first injection conduit pressure is at least the minimum injection pressure;

shutting the first injection valve;

sensing the first injection conduit pressure rate decrease over the time period;

comparing the first injection conduit pressure rate decrease to the first injection conduit pressure rate threshold decrease;

determining when the first injection conduit is unblocked when the first injection conduit pressure rate decrease is greater than the first injection conduit pressure rate threshold decrease;

opening the second injection valve;

flowing the cleaning fluid through the second injection conduit;

sensing the second injection conduit pressure is at least the minimum injection pressure;

shutting the second injection valve;

sensing the second injection conduit pressure rate decrease over the time period;

comparing the second injection conduit pressure rate decrease to the second injection conduit pressure rate threshold decrease; and determining when the second injection conduit is unblocked when the second injection conduit pressure rate decrease is equal to or greater than the second injection conduit pressure rate threshold decrease.

* * * * *

UNITED STATES PATENT AND TRADEMARK OFFICE
CERTIFICATE OF CORRECTION

PATENT NO. : 12,208,429 B2
APPLICATION NO. : 18/502849
DATED : January 28, 2025
INVENTOR(S) : Bader M. Al-Jarallah and Abdullah B. Samman Page 1 of 1

It is certified that error appears in the above-identified patent and that said Letters Patent is hereby corrected as shown below:

In the Claims

In Column 15, Line 60, Claim 1, please replace "fitting" with -- fitting; --.

Signed and Sealed this
Eighteenth Day of March, 2025

Coke Morgan Stewart
*Acting Director of the United States Patent and Trademark Office*